Dec. 3, 1963 F. T. JASKOWIAK 3,112,950
BODY TO FRAME ATTACHMENT MEANS FOR AUTOMOTIVE VEHICLES
Filed July 17, 1961 3 Sheets-Sheet 1
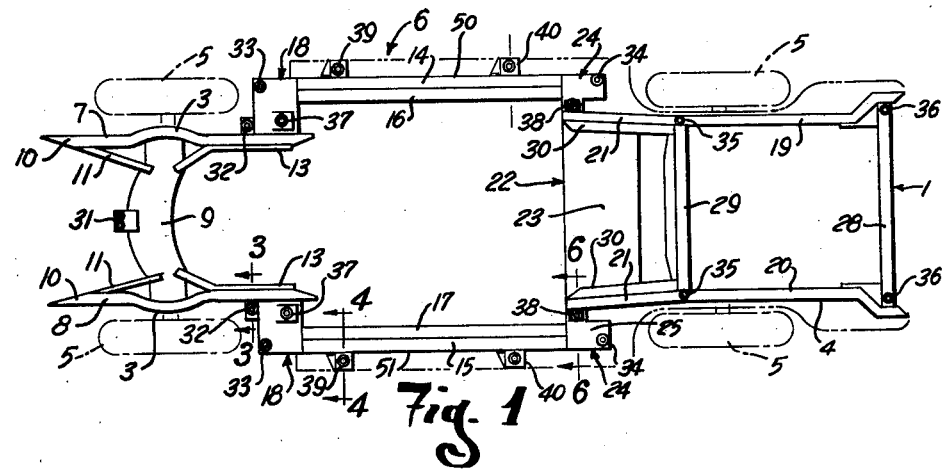
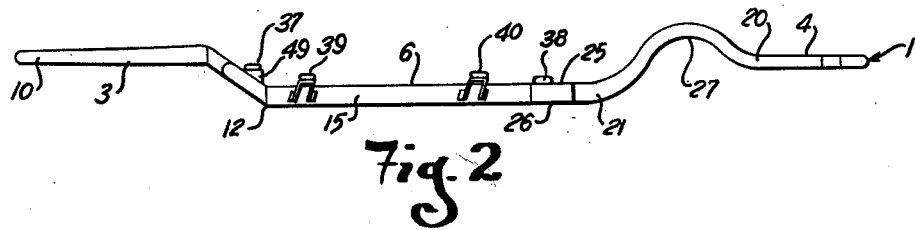
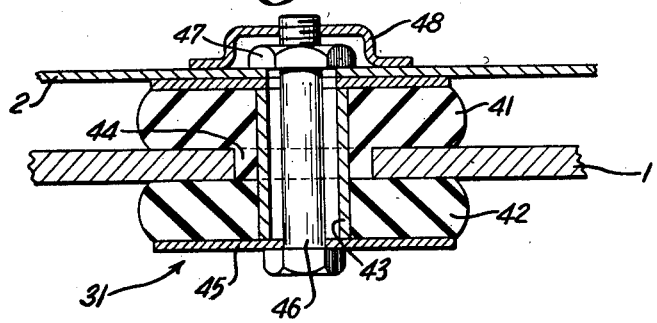
INVENTOR.
Frank T. Jaskowiak
BY Andrus & Starke
Attorneys

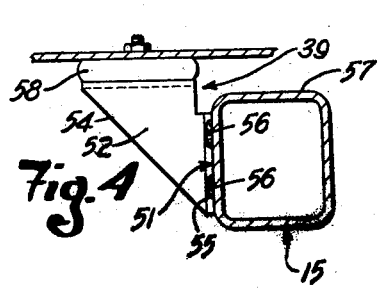
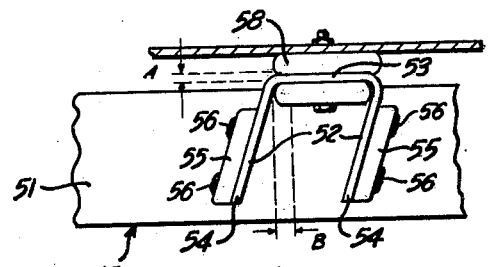
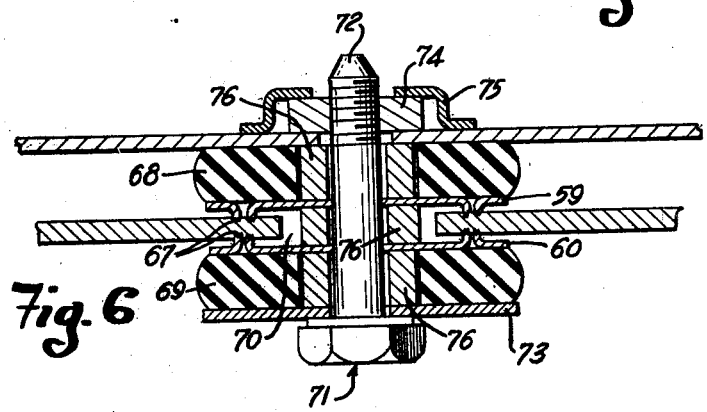
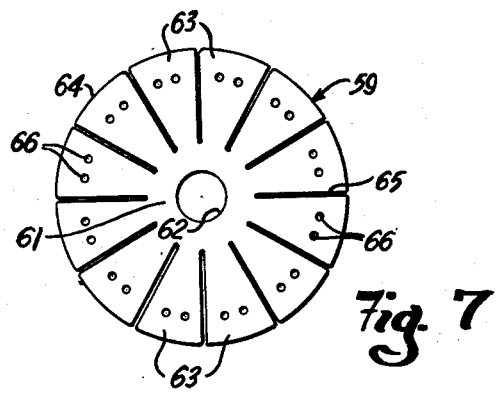
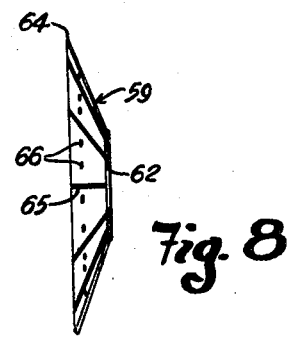
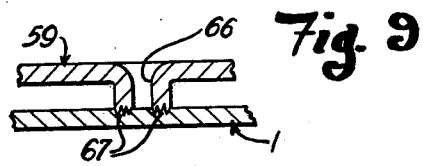
INVENTOR.
Frank T. Jaskowiak
BY
Andrus & Starke
Attorneys

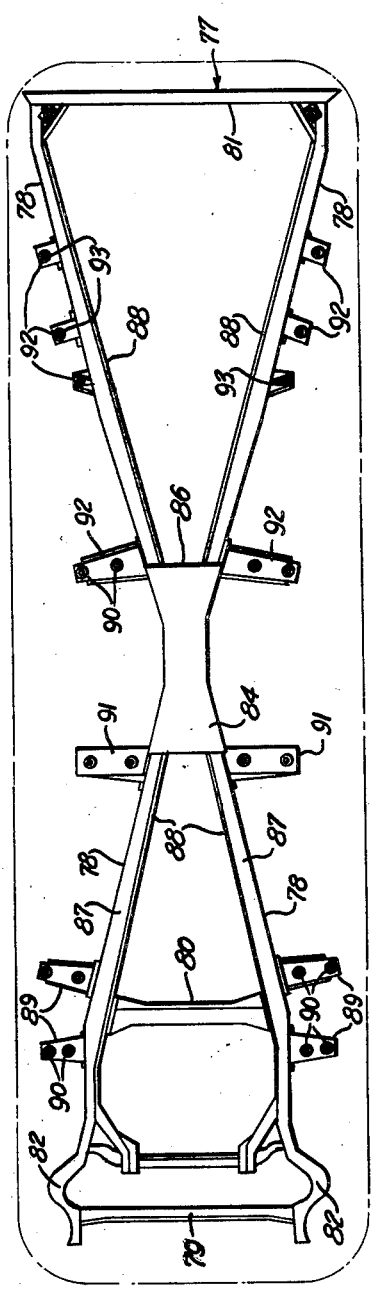
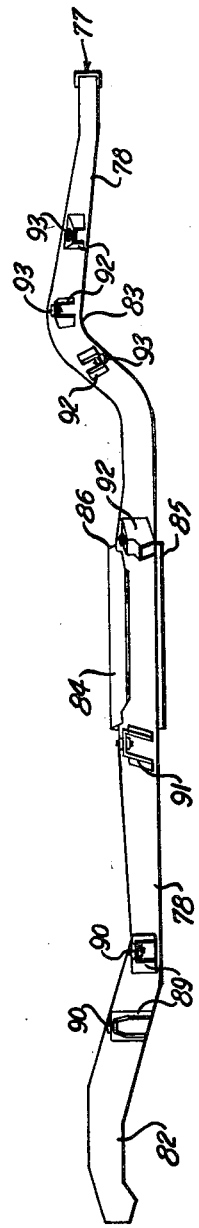
INVENTOR.
Frank T. Jaskowiak
BY
Andrus & Starke
Attorneys

United States Patent Office 3,112,950
Patented Dec. 3, 1963

3,112,950
BODY TO FRAME ATTACHMENT MEANS
FOR AUTOMOTIVE VEHICLES
Frank T. Jaskowiak, Milwaukee, Wis., assignor to A. O. Smith Corporation, Milwaukee, Wis., a corporation of New York
Filed July 17, 1961, Ser. No. 124,591
11 Claims. (Cl. 296—35)

The present invention relates to body to frame attachment means for automotive vehicles and more particularly to a body mounting system which combines the use of a high shear resisting shim with an articulated body supporting bracket to effect optimum damping of road vibrations conducted through the frame to the body.

The shear resisting shims are disposed at the particular frame to body attachment points where maximum damping of horizontal or shear vibrations is required. The articulated body bracket is interposed at those points on the body to frame attachment where damping of excessive vertical vibrations is required. The word "articulated" as used herein is intended to mean that the bracket is comprised of systematically interrelated, integrally jointed elements or parts. The net result of the combined damping effects is a soft, stable riding vehicle.

In an automotive vehicle having a separate frame and body, the body is generally attached to the frame through shims in the form of flexible rubber pads. These rubber shims are employed to provide maximum riding softness by damping both horizontal and vertical vibrations. However, only a small degree of resiliency is tolerable between the body and the frame to avoid excessive vibration and "drumming" of the body under severe road conditions and at high vehicle speeds. The unpleasant "drumming" effect occurs when the elastic modulus of the rubber shims is exceeded, and the full vibratory force is felt in the passenger compartment of the vehicle. Also, the sole use of rubber shims as a damping means limits the rigidity of the body to frame attachment and, therefore, sacrifices effective distribution of common loads between the body and frame.

In the past, attempts have been made to increase the rigidity of the body to frame attachment means by constructing the shims of a relatively hard rubber, but this results in a harsh riding vehicle, because the hard rubber shims do not dampen frame vibrations effectively. Also, reinforcing fiber strips, reinforcing plates, or small coil springs have been incorporated into a shim made from a more flexible, softer rubber in an attempt to modify its damping characteristics. This is done as a compromise in an attempt to obtain optimum vibration insulation while maintaining the required rigidity of the body to frame attachment.

In accordance with the present invention, the problem of obtaining optimum ride characteristics while maintaining body to frame rigidity is solved by a combination of two novel body mounting means in a unique system which obtains all the advantages of a rubber shim mounting system with none of the disadvantages thereof.

In the mounting system of this invention a pair of identical, precompressed, disc-shaped metal shims are disposed in gripping contact with the opposite surfaces of a frame member in alignment with a bolt hole in the frame. A standard body bolt is disposed in the bolt hole, and through the shims and connects the frame member to a vehicle body. Each shim has a series of barbed dimples spaced around its outer periphery which dig into the surfaces of the frame and provide a positive gripping contact therewith. Each shim also has a bolt hole through its center to receive the standard body bolt, and each shim is divided into equal pie-shaped segments by radial slits extending from the outer periphery and terminating near the central hub portion of the shim.

The shims are urged against the frame by the body bolt, and the vehicle body has a bolt hole, through which the threaded end of the body bolt extends. The body bolt is secured in place by means of a standard cage nut, which is tightened down on the body bolt so that the shims are precompressed. Three steel sleeve spacers are disposed on the body bolt to space apart the head of the body bolt, the shims, the vehicle body and the frame, to thereby provide good vertical flexibility while maintaining horizontal rigidity at the body to frame attachment point where the shims are used.

An articulated body bracket is also used in the body mounting system of this invention to further stabilize the load between the body and the frame without sacrificing desirable ride characteristics. The body bracket is used in combination with the shim mount to obtain optimum ride characteristics and passenger comfort.

The bracket of this invention comprises two supporting legs which are continuous with a central web portion. The supporting legs have flanged edges which are secured to the vertical side of the frame at a slight angle to a vertical reference line. The surface of the web portion is horizontally disposed and is slightly higher than the top surface of the frame to take the full load of the body member which is disposed immediately above it. The body member is rigidly connected to the articulated bracket by means of an insulated body bolt. The body bracket of this invention is adapted to damp horizontal vibrations between the frame and the body while providing an excellent connection for distributing loads between the vehicle body and frame.

The combined effects of the articulated body bracket mounts and the shear resisting shim mounts of this invention plus the use of some conventional load mounts at predetermined attachment points between the frame and vehicle body provide a novel body mounting system having optimum ride and load characteristics. The shim mounts provide excellent horizontal rigidity while offering only slight resistance to relative movement between the body and frame in a vertical direction, because the precompressed shims contribute additional veritcal resiliency to the respective shim mount, thereby increasing its vertical vibration damping capacity. The metal shims are free to deform and be displaced in the vertical direction only, and increase the speed of recovery of the shim mount, thereby effecting maximum damping of vertical vibrations. The articulated bracket mounts, on the other hand, absorb horizontal vibrations by freely allowing relative movement between the body and the frame in a horizontal direction while resisting vertical movement. The conventional load mounts are employed to carry the principal mass of the vehicle body, thereby increasing the damping efficiency of the shim mounts and the articulated bracket mounts.

The accompanying drawings illustrate the best mode presently contemplated for carrying out the invention.

In the drawings:

FIGURE 1 is a plan view of a wide hipped vehicle frame shown as supporting an underbody with the latter shown in phantom;

FIG. 2 is a side view of the frame shown in FIGURE 1;

FIG. 3 is an enlarged transverse section taken on line 3—3 of FIGURE 1 showing the conventional load mount;

FIG. 4 is a transverse section taken along line 4—4 of FIGURE 1 illustrating a body-to-frame mounting incorporating the articulated body bracket of this invention;

FIG. 5 is a side view of the body mounting shown in FIG. 4;

FIG. 6 is a transverse section taken along line 6—6 of

FIGURE 1 illustrating a body mounting incorporating the high shear resisting shim of this invention;

FIG. 7 is a plan view of the high shear resisting shim of this invention removed from the mounting;

FIG. 8 is a side view partially in section of the shim removed from the mounting;

FIG. 9 is an enlarged fragmentary section through the shim showing the dimple in gripping contact with the frame;

FIG. 10 is a plan view of an X-member vehicle frame shown as supporting an underbody with the latter shown in phantom; and FIG. 11 is a side view of the frame shown in FIG. 10.

The drawings show two different types of motor vehicle frames with their respective body members attached thereto by means of selected arrangements of the body attachment system of this invention.

FIGURE 1 illustrates a wide hipped frame 1 disposed in supporting relation to the underbody 2 of a separate body structure shown in phantom. Frame 1 comprises generally the relatively narrow forward and rearward portions 3 and 4, respectively, adapted to be disposed and supported between the transversely spaced wheels 5 shown in phantom lines, and a relatively wide intermediate portion 6 between the forward and rearward portions.

The forward portion 3 of the vehicle frame comprises a pair of transversely spaced and generally horizontally extending side rails 7 and 8 connected by the usual front cross bar assembly 9. Each of the side rails 7 and 8 includes an outer rail 10 disposed with the flanges thereof extending inwardly. Braces 11 extend angularly between the outer rails 7 and 8 and the cross bar assembly 9.

In the area just back of the front wheels 5, the rear portions of outer rails 7 and 8 bend downwardly at an angle corresponding generally to the angle of the toe board (not shown) and terminate rearwardly of the toe board at points 12 generally at the level of minimum ground clearance for the vehicle.

Side rails 7 and 8 are boxed rearwardly of the front cross bar assembly 9 by the addition of a channel section inner rail 13 having flanges disposed outwardly and joined to the flanges of outer rails 10.

The intermediate portion 6 of the frame comprises generally a pair of transversely spaced side bars 14 and 15 which are spaced outwardly of side rails 7 and 8, respectively. Side bars 14 and 15 are generally straight horizontally extending channel members having flanges directed inwardly and are disposed at the level of minimum ground clearance. Side bars 14 and 15 are boxed except for their end portions by the addition of channel section inner rails 16 and 17 having flanges disposed outwardly and joined to the flanges of side bars 14 and 15, respectively. The forward end of side bars 14 and 15 longitudinally overlap the rear portion of side rails 7 and 8 and bend upwardly beneath the toe board at at angle parallel to the downwardly bent end of the respective side rails.

The downwardly extending end portions of side rails 7 and 8 are respectively connected to the corresponding upwardly extending end portions of side bars 14 and 15 by means of right angle offset members 18.

Rearwardly the side bars 14 and 15 extend beyond the front edge of the rear seat area, and longitudinally overlap the rear side rails 19 and 20, respectively, of rearward frame portion 4. The rear side rails 19 and 20 each comprise a channel section outer rail 21 having inwardly disposed flanges and are spaced inwardly from side bars 14 and 15 and extend rearwardly from the front edge 22 of the rear seat area 23. The forward end portions of outer rails 21 are disposed at the level of minimum ground clearance and, therefore, generally parallel to the respective side bars 14 and 15.

The generally rectangular tubular or box-section offset members 24 extend at right angles between the overlapped portions of the respective outer rails 21 and the corresponding side bars 14 and 15. Like offset members 18, the members 24 have a relatively large cross-section and each has upper and lower surfaces 25 and 26 which are spaced to correspond to the flange spacings of side bars 14 and 15 and outer rail 21. The offset members 24 are welded respectively to the outside of outer rails 21 and to the inwardly extending flanges of side bars 14 and 15.

At the rear of offset members 24, the outer rails 21 are provided with kickup 27 to accommodate the rear axle and wheel suspensions, and a usual cross member 28 connects the rails rearwardly.

A shock bar 29 also extends between outer rails 21 forwardly from the crest of the kicked up area 27. Rear side rails 19 and 20 are boxed forwardly from the shock bar 29 by means of channel section inner rails 30 having flanges disposed outwardly and joined to the flanges of outer rails 21.

As shown in FIGURE 1, the body mounting system of this invention adapted for a wide hipped frame comprises a combination or six pairs of conventional load mounts 31, 32, 33, 34, 35, and 36, two pairs of shear resisting shim mounts 37 and 38, and two pairs articulated bracket mounts 39 and 40.

The load mounts 31 are conventional body mounts presently used in conventional frame to body attachment systems and each includes a rubber washer pad 41 and a rubber washer rebound 42 which are disposed on opposite sides of frame 1.

A steel spacer tube 43 is disposed to extend through bolt hole 44 in the frame, and also through the central openings in the pad 41 and the rebound 42, respectively. The rebound 42 is held against frame 1 by a steel washer 45 which is in turn retained by body bolt 46. Body bolt 46 threadably receives cage nut 47, which is threaded down on body bolt 46 to press against the body member 2 and hold body member 2 against pad 41. Cage 48 protects cage nut 47 from the elements.

The load mounts 31 are disposed adjacent each other directly below the vehicle engine on frame cross bar 9. The pair of load mounts 32 are disposed on both sides of the frame 1 just forward of the offset members 18 on side rails 10, and cooperate with mounts 31 to support the heavy front portion of the vehicle.

Load mounts 33 are disposed at each forward corner of the main body portion 6 of the vehicle frame to support the passenger section of the body along with load mount 34, which are disposed at the rear corners of the main body portion 6 of the vehicle frame. Load mounts 35 are disposed on the rear side rails 19 and 20 at their respective joints with shock bar 29. The rearward cross member 28 carries a pair of load mounts 36, which cooperate with load mounts 35 to support the rear portion of the vehicle.

The load mounts 31, 32, 33, 34, 35 and 36 carry the bulk of the weight of the vehicle body and engine. However, such mounts only partially dampen road shocks and vibrations, so in order to more completely dampen the vibrations and shocks, the additional mounting means of this invention are required. In those portions of the vehicle where the highest rate of vibrations occur, the addition of the metal damping means of the invention to the damping capacity of the conventional load mounts 31, etc., further supplements and improves the damping capacity of the vehicle mounting system.

The two pairs of shear resisting shim mounts 37 and 38 are disposed at the forward and rearward ends of the intermediate portion 6 of the frame 1, respectively. The pair of shims 37 are each disposed on the inclined surface of the offset members 18, respectively, on wedge shaped brackets 49 so that the vibration axis of the shims 37 is substantially vertical. The upper surfaces of the rear offset members 24 are horizontal, so the shims 38 can be disposed directly thereon.

Two pairs of articulated brackets 39 and 40 are mounted on the outer vertical sides 50 and 51 of the side bars 14 and 15, respectively of the frame 1. The brackets 39 are disposed rearwardly from the offset members 18, and are adapted to resiliently support the forward part of the passenger section of the vehicle. The articulated brackets 39 and 40 dampen horizontal road shocks, which would otherwise be transmitted with full impact to the passenger compartment of the vehicle. Brackets 40 are disposed just forward of the rear offset member 24 and serve the same function.

Each articulated bracket generally comprises a pair of legs 52 and a central web portion 53. The legs 52 each have a pair of diagonal edges 54. The inner ends of legs 52 terminate in flanges 55 which are perpendicular to the plane of the legs 52 and are adapted to rest flatwise against the outer vertical sides 50 and 51 of the side bars 14 and 15, respectively. Flanges 55 are shown secured to side bars 14 and 15 by welds 56.

When viewed from the side, as shown in FIGURE 5, each bracket is an inverted U-shaped configuration, with the legs 52 disposed in parallel planes slightly inclined from the vertical. The top surface of the web portion 53 is slightly higher than the top surfaces 57 of side bars 14 and 15, and the web portion 53 is adapted to receive a conventional load mount 58, similar to the load mounts 31 previously described, and as shown in FIG. 3.

As can be best seen in FIG. 5, when the frame 1 receives a horizontal impact, the bracket absorbs and prevents transmission of the shock to the passenger compartment of the vehicle in an amount indicated between the arrows at B in FIG. 5, while vertical motion, as indicated between the arrows at A is relatively insignificant. This desirable damping characteristic is due to the slightly off-vertical disposition of the legs 52. All of the articulated brackets 39 and 40 are disposed so that the axes of the legs 52 slant rearwardly because substantially all horizontal impacts come from the front of the vehicle.

As the vehicle travels along a roadway, the number of horizontal impacts increases in proportion to increases in speed. At normal speeds, these impacts set up high amplitude vibrations in the vehicle frame which, if transmitted to the vehicle body, create discomfort to the passengers. The damping effect of the articulated brackets absorbs and dissipates the high amplitude vibrations, thereby effecting more desirable ride characteristics.

The two pairs of high shear resisting shim mounts 37 and 38 are similar to the conventional load mounts described above, but with the addition of a pair of saucer shaped metal shims 59 and 60. The shims 59 and 60 are adapted to provide high resistance to horizontal motion between the frame 1 and the body 2.

Each shim 59 and 60 is generally saucer shaped, and includes a central hub 61, a bolt opening 62, radial leaves 63, and a peripheral edge 64. Bolt opening 62 is centrally disposed in hub 61, and a plurality of slits 65 radiate from the hub 61 and extend outwardly to the peripheral edge 64 to divide the outer portion of each shim into triangularly shaped radial leaves 63. A plurality of serrated dimples 66 are disposed around the peripheral edge 64 of each shim in the radial leaves 63. Each dimple 66 has serrated teeth 67 adapted to penetrate and firmly grip a portion of frame 1, as shown in FIG. 9. Each shim is generally saucer shaped, as mentioned above, and the serrated teeth 67 extend outwardly from the concave surface of the shims 59 and 60.

As shown in FIG. 6, each shim mount 37 and 38 includes a rubber washer pad 68 and a rubber washer rebound 69 disposed on opposite sides of a bolt hole 70 in frame 1. The upper metal shim 59 is disposed between frame 1 and washer pad 68, with the serrated teeth 67 penetrating frame 1. The lower shim 60 is oppositely disposed between the rebound 69 and the frame 1, and also grips frame 1 by means of the serrated teeth 67.

The shims 59 and 60 are retained under compression, as shown in FIG. 6, by means of a standard body bolt assembly 71, which includes a body bolt 72, a washer 73, a cage nut 74, and a cage 75. Tubular steel spacers 76 are disposed between the cage nut 74 and shim 59, between the shims 59 and 60, and between shim 60 and washer 73, respectively, to provide accurate fixed spacing between the elements of the shim mounts.

The shims 59 and 60 are purposely compressed to cause the serrated teeth 67 to be continuously pressed into the frame 1 and thereby retain positive gripping contact at all times with frame 1. In this manner, shim mounts 37 and 38 are adapted to effectively resist all horizontal relative motion between the frame 1 and and body 2 at the point of attachment.

Even though the shims 59 and 60 provide high shear resistance, they offer little resistance to a high vertical rate of motion between the frame 1 and the body 2, and actually supplement the damping action of the washer pad 68 and the washer rebound 69. The shim mounts 37 and 38 are, therefore, best located at frame to body attachment points where horizontal rigidity is required with a high degree of vertical vibration damping between the vehicle body and frame.

The X-member frame in FIG. 10 is shown incorporating the body mounting system of this invention. The ride characteristics of this type of frame are different than for the wide hipped frame, so the relative disposition of the three types of mounts differs from the mount disposition shown above, although each type of mount functions as previously described.

The X-member frame 77 shown in FIG. 10 includes a pair of side rails 78 connected together by a front suspension cross bar 79, an engine support cross bar 80, and a rear cross bar 81. Each side rail 78 has a pair of kicked up portions 82 and 83 which are offset in a vertical plane, as best shown in FIG. 11.

The side rails 78 converge toward each other and are connected together at the center of the frame by a top plate 84 and a bottom plate 85 to define a central tunnel 86. Each side rail 78 is generally box shaped in cross section, comprising a pair of channel members 87 and 88 with their open sides facing each other and secured together at intervals throughout their length.

A plurality of body brackets extend outwardly from each side rail 78 and are adapted to support the vehicle body. The two pair of brackets 89 at the forward part of the frame are connected to the body through shim mounts 90 such as previously described in the first embodiment of the invention, and as shown in FIGS. 6, 7, 8 and 9. The vertical damping characteristics of the shim mounts are most effective in the front portion of this frame because the vehicle engine, which represents about one fourth of the total mass, is disposed above and is supported by the forward portion of the frame. The shim mounts 90 provide excellent resistance to horizontal motion between the frame and the body, while providing a high vertical damping so that most vertical vibrations coming through the frame to the body are absorbed by the damping effect of shim mounts 90.

A pair of articulated brackets 91 are disposed to extend outwardly from side rails 78 at the forward end of the tunnel 86. The articulated brackets 91 are similar to those described previously and as shown in FIGS. 4 and 5. As stated above, the articulated brackets provide an excellent damping means for horizontal vibrations, and for this reason, the articulated brackets 91 are disposed directly below the forward part of the passenger section of the vehicle. The brackets 91 prevent the horizontal vibrations received through the frame from being transmitted to the passenger section of the vehicle body.

At the rearward end of the central tunnel 86, a pair of conventional brackets 92 are disposed to extend outwardly from side rails 78. The brackets 92 are like brackets 89, and each have a pair of shim mounts 90 mounted thereon to provide a high vertical damping rate at this portion of the vehicle frame to prevent undesirable vertical vibrations from being transferred forwardly through the frame to the passenger compartment of the vehicle.

Three additional pairs of conventional body brackets 92 extend outwardly from side rails 78 in the rear portion of the frame and each has conventional load mounts 93 disposed thereon. Load mounts 93 are similar to the load mounts previously described and as shown in FIG. 3. Load mounts 93 are disposed over the rear wheel suspension of the vehicle where good load bearing characteristics in the frame are required and where the wheel suspension is best adapted to absorb undesirable road vibrations.

The body to frame attachment system of this invention is adaptable to any of the various vehicle frame designs and to partial frames, also. The two mounting units of the invention can be effectively combined to provide excellent vehicle riding characteristics and ultimate passenger comfort by isolating undesirable frame vibrations from the passenger section of the vehicle body.

Various modes of carrying out the invention are contemplated as being within the scope of the following claims particularly pointing out and distinctly claiming the subject matter which is regarded as the invention.

I claim:

1. A compressible metal disc for use in a vehicle body to frame attachment including a body bolt connecting the vehicle body and frame, a plurality of annular resilient elements assembled on said body bolt, comprising, an annular hub having a central opening, a plurality of generally triangular spring members generating radially from the hub, said spring members being spaced from each other by narrow slits radiating from said hub, and a plurality of serrated projections disposed around the outer periphery of said spring members, said projections being disposed to engage a frame of the vehicle, said metal disc being disposed having said body bolt extending through the central opening thereof and said annular resilient elements assembled with said body bolt and said metal disc to define a vertically flexible horizontally rigid body mount to thereby isolate vertical vibrations in the frame from the passenger compartment of the vehicle body.

2. A vehicle body mounting system, comprising a plurality of load bearing connectors disposed between and connecting a vehicle body to a frame at the attachment points where the frame is subject to the greatest body load, a plurality of vibration damping connectors disposed between and connecting the vehicle body to the frame, and a plurality of flexible metal vibration damping brackets secured to the frame, said brackets each having one end rigidly attached to said frame and having a second end disposed above the level of said frame to provide means to support at least one load bearing connector disposed thereon between the bracket and the vehicle body, said brackets each having an intermediate portion between the attachment point to said frame and the point of attachment to said body permitting resiliency in a horizontal direction while resisting vertical deflections between the frame and the vehicle body, said vehicle body mounting system providing isolation of substantially all undesirable frame vibrations from the passenger compartment of the vehicle body.

3. The structure of claim 2 in which the vibration damping brackets each comprises a channel member having a pair of flanges and a web portion, said flanges being attached to a side of said frame and extending at an acute angle to a vertical plane to provide a resilient mounting bracket adapted to isolate vertical vibrations of said frame from the passenger compartment of said vehicle.

4. The structure of claim 2 in which the vibration damping brackets each comprises an inverted, generally U-shaped member having a pair of legs and a bridge portion, a flange portion on each of the legs welded to a vertical surface of the frame, and a load bearing connector disposed on the bridge portion of the inverted U-shaped member, and disposed to support the vehicle body, said U-shaped member providing a vibration damping member which is relatively flexible in a horizontal direction and substantially rigid in a vertical direction to thereby isolate substantially all horizontal vibrations of the vehicle frame from the passenger compartment of the vehicle body.

5. The structure of claim 2 in which the vibration damping brackets each comprises a first leg having a top horizontal edge and having a side edge thereof secured to a vertical surface of the frame, the planar surface of said leg being slightly offset from the transverse vertical plane of the frame, a substantially horizontal bridge portion connected to said first leg along the top horizontal edge and supported thereby, and a second leg having a top horizontal edge connected to the other end of the bridge portion, said second leg also having a side edge thereof secured to the vertical surface of the frame, said second leg being disposed with its planar surface substantially parallel to the planar surface of said first leg, said vibration damping bracket providing a horizontally flexible, vertically rigid mounting means for a load bearing connector between the vehicle body and the frame.

6. In a vehicle frame, a flexible, single-piece metal mounting bracket rigidly attached to said frame for supporting a vehicle body, said bracket comprising a first end portion rigidly attached to said frame, a second end portion displaced from said frame and resiliently connecting said frame to the vehicle body, and a flexible portion intermediate said end portions which is vertically rigid and horizontally flexible to provide a body mounting bracket having a high degree of horizontal flexibility and substantially no vertical flexibility.

7. A vehicle body mounting construction for attaching a vehicle body to a frame at a plurality of attachment points, which comprises a first plurality of body mounts each including a resilient metal damping element in combination with a rubber damping element, said mounts each having a high vertical vibration damping characteristic and a low horizontal vibration damping characteristic provided by said resilient metal damping element, said body mounts being disposed between the body and frame at the attachment points where the frame is subject to the greatest amplitude of vertical vibrations, and a second plurality of body mounts each including a flexible metal damping bracket having a rubber damping element mounted thereon, said last named mounts having a high horizontal vibration damping characteristic and a low vertical vibration damping characteristic provided by the horizontal flexing of the flexible metal damping bracket, said bracket having one end rigidly attached to the frame and having an intermediate portion between the attachment point to said frame and the point of attachment to said body permitting resiliency in a horizontal direction while resisting vertical deflection between the frame and body, said last named mounts being disposed between the body and frame at the attachment points where the frame is subject to the greatest amplitude of horizontal vibrations to provide a vehicle body mounting construction which isolates and prevents transfer of horizontal and vertical vibrations from the vehicle frame to the passenger compartment of the vehicle body.

8. The structure of claim 7 in which the horizontally rigid, vertically flexible body mounts each includes a pair of apertured concave resilient metal discs with the peripheral portion of each disc disposed in gripping contact with the vehicle frame and adapted to absorb and dampen vertical vibrations of the frame, thereby isolating the vehicle body from vertical vibrations.

9. The structure of claim 7 in which the horizontally rigid, vertically flexible body mounts include a pair of identical concave metal discs disposed on opposite sides of the frame at the attachment points, clamping means for compressing the metal discs into firm gripping relationship with said frame, thereby preventing horizontal displacement between the frame and the vehicle body, and spacing means for limiting the compression of the metal discs under static load conditions.

10. The structure of claim 7 in which the vertically rigid, horizontally flexible body mounts include a plurality of apertured metal discs having serrated teeth disposed to positively grip and hold the vehicle frame in generally fixed vertical relationship to the body and allow horizontal displacement between the vehicle body and frame.

11. The structure of claim 7 in which the horizontally rigid, vertically flexible body mounts include a plurality of concave sheet metal discs, each having a central opening with an annular hub portion, and each having a plurality of triangularly shaped leaves radiating from said hub portion with the peripheral portions of the leaves being disposed in gripping contact with the frame and a body bolt assembly disposed through the central opening of the sheet metal discs to connect the frame to the vehicle body and to hold said metal discs under compression.

References Cited in the file of this patent

UNITED STATES PATENTS

| | | |
|---|---|---|
| 1,867,806 | Brownell | July 19, 1932 |
| 2,549,102 | Kramer | Apr. 17, 1951 |